United States Patent
Yamamoto et al.

(10) Patent No.: US 11,949,304 B2
(45) Date of Patent: Apr. 2, 2024

(54) ROTARY ELECTRIC MACHINE AND STATOR THEREOF

(71) Applicant: DENSO CORPORATION, Kariya (JP)

(72) Inventors: Masayoshi Yamamoto, Kariya (JP); Mai Goto, Kariya (JP); Shigenori Yoneda, Kariya (JP)

(73) Assignee: DENSO CORPORATION, Kariya (JP)

( * ) Notice: Subject to any disclaimer, the term of this patent is extended or adjusted under 35 U.S.C. 154(b) by 437 days.

(21) Appl. No.: 17/391,584

(22) Filed: Aug. 2, 2021

(65) Prior Publication Data
US 2021/0367469 A1  Nov. 25, 2021

Related U.S. Application Data

(63) Continuation of application No. PCT/JP2020/003140, filed on Jan. 29, 2020.

(30) Foreign Application Priority Data

Mar. 28, 2019 (JP) .................................. 2019-064485

(51) Int. Cl.
*H02K 3/28* (2006.01)
*H02K 3/12* (2006.01)

(52) U.S. Cl.
CPC ................. *H02K 3/28* (2013.01); *H02K 3/12* (2013.01)

(58) Field of Classification Search
CPC ............... H02K 3/12; H02K 3/24; H02K 3/28
USPC ........................................................ 310/208
See application file for complete search history.

(56) References Cited

U.S. PATENT DOCUMENTS

| | | | | |
|---|---|---|---|---|
| 2011/0012450 A1* | 1/2011 | Umeda | ..................... | H02K 3/50 310/71 |
| 2011/0012472 A1* | 1/2011 | Umeda | .............. | H02K 15/0478 310/207 |
| 2011/0095639 A1* | 4/2011 | Nakamura | ............. | H02K 15/02 29/592.1 |
| 2011/0133593 A1* | 6/2011 | Nakamura | ............... | H02K 3/12 310/201 |
| 2011/0174037 A1* | 7/2011 | Akimoto | .................. | H02K 3/28 72/127 |
| 2011/0175472 A1* | 7/2011 | Koike | ....................... | H02K 3/50 310/71 |
| 2011/0175483 A1* | 7/2011 | Koike | ....................... | H02K 3/12 310/201 |

(Continued)

OTHER PUBLICATIONS

U.S. Appl. No. 17/391,465, filed Aug. 2, 2021 in the name of Mai Goto.

(Continued)

*Primary Examiner* — Rashad H Johnson
(74) *Attorney, Agent, or Firm* — Oliff PLC

(57) ABSTRACT

A rotary electric machine includes a stator. The stator has a coil end provided by a plurality of joint portions. The coil end has a leader wire connected to a power terminal. The stator has a coil end provided by a plurality of turn portions. The coil end has a circumferential pair whose top portions are offset in a circumferential direction. The circumferential pair has a height HG21. The coil end has an axial pair whose top portions are offset in an axial direction. The axial pair has a height HG22. The housing has a facing surface facing the coil end. The coil end provides a height distribution which adapts an unevenness of the opposing surface.

10 Claims, 6 Drawing Sheets

(56) References Cited

U.S. PATENT DOCUMENTS

| | | | |
|---|---|---|---|
| 2011/0260571 A1* | 10/2011 | Kashihara | H02K 3/28 310/207 |
| 2012/0019081 A1* | 1/2012 | Tamura | H02K 3/50 310/43 |
| 2013/0014381 A1* | 1/2013 | Kayukawa | H02K 15/0478 29/596 |
| 2013/0300244 A1* | 11/2013 | Kashihara | H02K 3/28 310/184 |
| 2015/0076953 A1* | 3/2015 | Tamura | H02K 3/28 310/208 |
| 2015/0280507 A1* | 10/2015 | Kayano | H02K 9/19 310/71 |
| 2017/0133968 A1* | 5/2017 | Takahashi | H02K 3/345 |
| 2017/0237310 A1* | 8/2017 | Nakamura | H02K 3/02 310/195 |
| 2017/0256997 A1* | 9/2017 | Nakayama | H02K 9/19 |
| 2017/0271937 A1* | 9/2017 | Takei | H02K 3/38 |
| 2018/0034339 A1* | 2/2018 | Hashimoto | H02K 3/345 |
| 2019/0097484 A1* | 3/2019 | Kaneshige | H02K 15/0068 |
| 2019/0149003 A1* | 5/2019 | Ishikawa | H02K 1/2706 310/179 |
| 2019/0267861 A1* | 8/2019 | Nakayama | H02K 3/12 |
| 2021/0359568 A1* | 11/2021 | Goto | H02K 15/0081 |
| 2021/0367469 A1* | 11/2021 | Yamamoto | H02K 3/12 |
| 2021/0367489 A1* | 11/2021 | Goto | H02K 3/50 |
| 2021/0408856 A1* | 12/2021 | Fukunaga | H02K 3/48 |
| 2022/0052586 A1* | 2/2022 | Nagase | H02K 3/12 |
| 2022/0069651 A1* | 3/2022 | Saito | B60L 50/51 |
| 2022/0140681 A1* | 5/2022 | Uga | H02K 3/28 310/198 |
| 2022/0247287 A1* | 8/2022 | Takada | H02K 5/225 |
| 2022/0320936 A1* | 10/2022 | Takada | H02K 3/28 |
| 2022/0393540 A1* | 12/2022 | Misaki | H02K 3/50 |
| 2023/0163649 A1* | 5/2023 | Song | H02K 3/12 310/179 |
| 2023/0268791 A1* | 8/2023 | Osugi | H02K 15/0081 310/214 |
| 2023/0369921 A1* | 11/2023 | Takeda | H02K 3/28 |

OTHER PUBLICATIONS

U.S. Appl. No. 17/391,541, filed Aug. 2, 2021 in the name of Mai Goto.

* cited by examiner

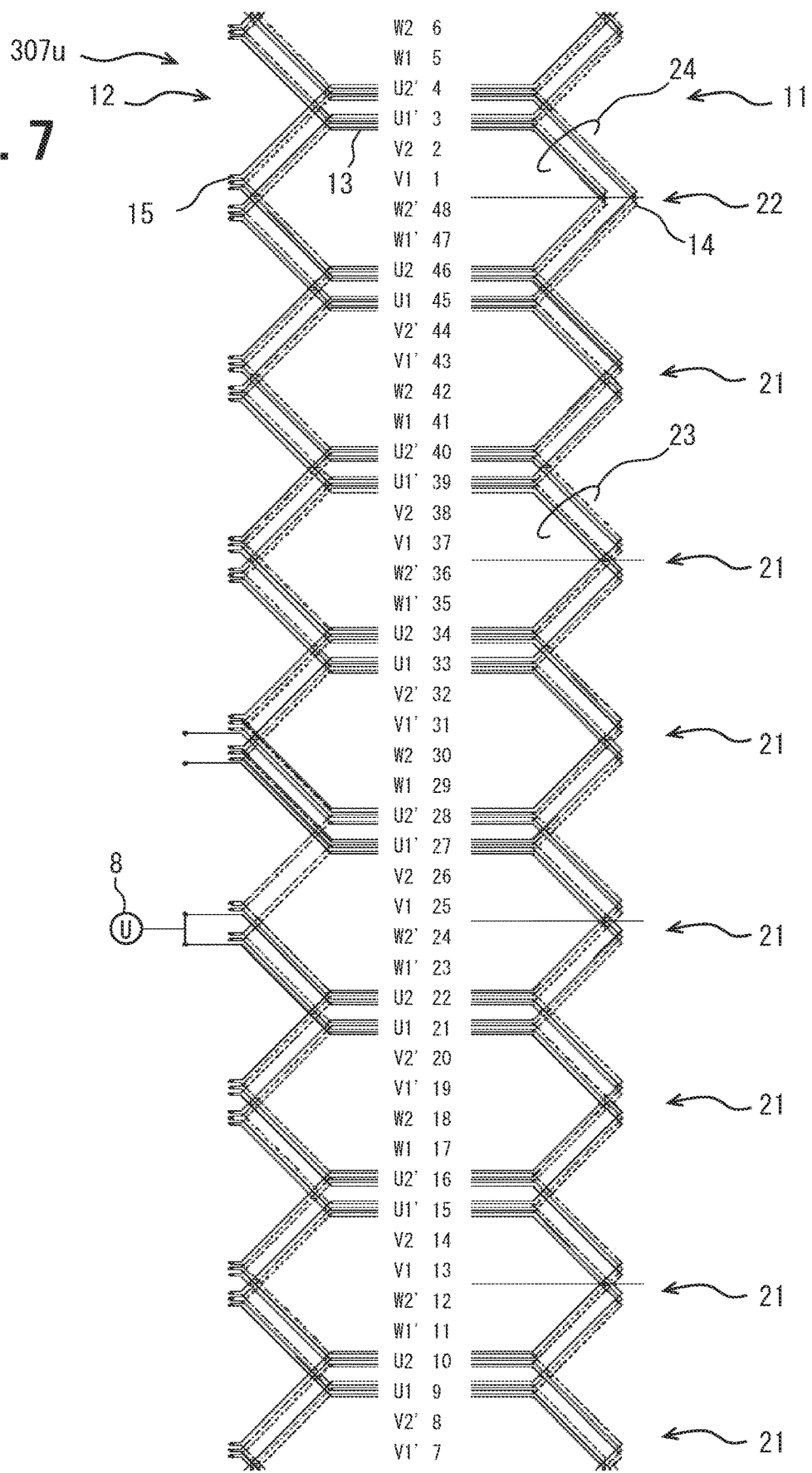

ROTARY ELECTRIC MACHINE AND STATOR THEREOF

CROSS REFERENCE TO RELATED APPLICATIONS

The present application is a continuation application of International Patent Application No. PCT/JP2020/003140 filed on Jan. 29, 2020, which designated the U.S. and claims the benefit of priority from Japanese Patent Application No. 2019-64485 filed in Japan filed on Mar. 28, 2019, the entire disclosure of the above application is incorporated herein by reference.

TECHNICAL FIELD

The disclosure in this specification relates to a rotary electric machine and a stator thereof.

BACKGROUND

A rotary electric machine has a stator and a housing which accommodates the stator.

SUMMARY

A housing of a rotary electric machine may have a complicated shape to meet various demands. On the other hand, the housing needs to provide a sufficient gap between a coil end of a stator housed in the housing. In the above aspects, or in other aspects not mentioned, there is a need for further improvements in a rotary electric machine and a stator thereof.

A stator of a rotary electric machine disclosed herein, the stator comprising: a stator core which has a plurality of slots; and a stator coil which connects a plurality of straight portions arranged in the plurality of slots by a plurality of turn portions in a first coil end on one end, and connects a plurality of straight portions arranged in the plurality of slots by a plurality of joint portions in a second coil end on the other end, wherein the first coil end is arranged with the plurality of turn portions so as to form a circumferential pair whose top portions are shifted in a circumferential direction and an axial pair whose top portions are shifted in an axial direction, and wherein the second coil end is arranged with lead wires connected to power terminals.

According to the stator of the rotary electric machine disclosed, both the circumferential pair and the axial pair are mounted on the first coil end formed by the plurality of turn portions. The circumferential pair and the axial pair provide different heights with respect to the axial direction. Therefore, a height distribution is provided at the first coil end.

A rotary electric machine disclosed herein, comprising: the stator described above, and a housing which accommodates the stator, and has an opposing surface including a convex portion facing the circumferential pair and a concave portion facing the axial pair.

The disclosed aspects in this specification adopt different technical solutions from each other in order to achieve their respective objectives. Reference numerals in parentheses described in claims and this section exemplarily show corresponding relationships with parts of embodiments to be described later and are not intended to limit technical scopes. The objects, features, and advantages disclosed in this specification will become apparent by referring to following detailed descriptions and accompanying drawings.

BRIEF DESCRIPTION OF DRAWINGS

The disclosure is further described with reference to the accompanying drawings in which:

FIG. 7 is a winding diagram showing a coil end according to a third embodiment.

DESCRIPTION OF EMBODIMENT

Figure 1:
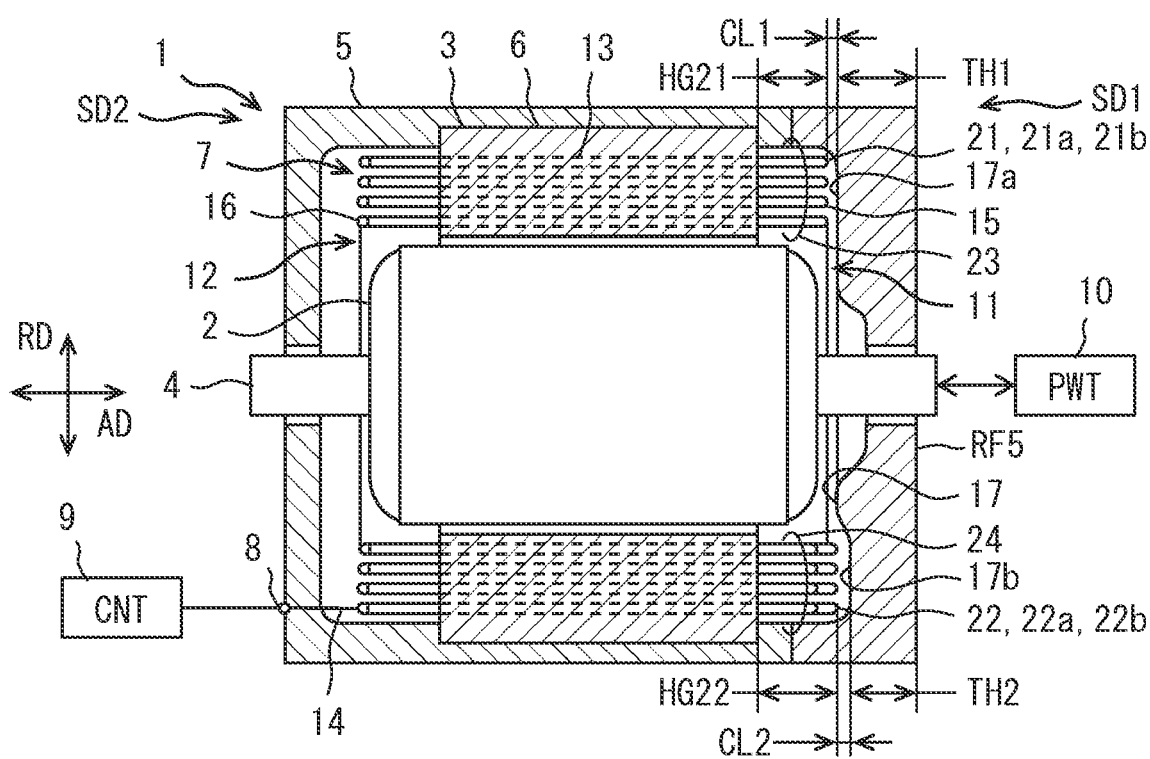
FIG. 1 is a cross-sectional view of a rotary electric machine of a first embodiment.

Several embodiments are described with reference to the drawings. In some embodiments, parts which are functionally and/or structurally corresponding and/or associated are given the same reference numerals, or reference numerals with different hundreds digit or higher digits. For corresponding parts and/or associated parts, reference can be made to the description of other embodiments.

First Embodiment

In FIG. 1, a rotary electric machine 1 is a motor generator. The rotary electric machine 1 is operatively coupled to a power system 10 (PWT) of an apparatus. The rotary electric machine 1 can function as a generator which generates electric power using power supplied from the power system 10. The rotary electric machine 1 can function as an electric motor which supplies power to the power system 10. The rotary electric machine 1 may be a generator or an electric motor. The power system 10 may include an internal combustion engine. The power system 10 provides a main power for the apparatus. In this specification, the apparatus may include a vehicle, an air conditioner, a pumping device, or the like. Furthermore, the term vehicle includes a car, a ship, an aircraft, a simulation device, and an amusement device.

The rotary electric machine 1 has a rotor 2 and a stator 3. The rotor 2 has a shaft 4. The rotor 2 is rotatable. The stator 3 is a cylindrical member. The rotor 2 and the stator 3 are accommodated in a housing 5. The housing 5 fixes the stator 3 and supports the rotor 2 in a rotatable manner. The housing 5 may provide components of the power system 10. For example, the housing 5 may provide a part of a crankcase or a part of a transmission case.

The rotor 2 is magnetically coupled with the stator 3. The rotor 2 is supported by a shaft 4 so as to be rotatable with respect to the housing 5. The shaft 4 provides a rotational axis. The rotation axis is coupled to the power system 10. The rotor 2 is disposed in a radial direction inside of the stator 3. The rotor 2 has a plurality of magnetic poles arranged along the circumferential direction. The plurality of magnetic poles are formed by a plurality of permanent magnets embedded in the rotor 2. The rotor 2 can be provided by various structures.

The stator 3 has a stator core 6. The stator core 6 is a cylindrical shape. The stator core 6 is an annular shape. The stator core 6 has a plurality of steel plates laminated along the axial direction. The stator core 6 has a plurality of slots arranged in the circumferential direction. The plurality of slots are arranged at an equal pitch with respect to the circumferential direction. The plurality of slots may be arranged at several different pitches. The plurality of slots extend in the axial direction so as to penetrate the plurality of steel plates. Further, the plurality of slots extend in the radial direction. A typical stator core 6 has an annular back core. The stator core 6 has a plurality of teeth extending out in the radial direction inside from the back core. The plurality of teeth form a plurality of slots between them.

The stator 3 has a stator coil 7. The stator coil 7 is attached to the stator core 6. The rotary electric machine 1 has a power terminal 8. The rotary electric machine 1 has a plurality of power terminals 8. The power terminal 8 is a terminal for electrically connecting the rotary electric machine 1 and a control device (CNT) 9. The power terminal 8 is used as an output terminal when outputting electric power, and as an input terminal when receiving electric power. The power terminal 8 may also be called an external connection terminal of the rotary electric machine 1.

The rotary electric machine 1 is electrically connected to the control device 9. The control device 9 includes an inverter circuit. When the rotary electric machine 1 functions as a generator, it is driven by the power system 10 and outputs electric power. The control device 9 functions as a rectifier circuit which rectifies the electric power output from the rotary electric machine 1 when the rotary electric machine 1 is used as a generator. When the rotary electric machine 1 functions as an electric motor, it supplies power to the power system 10. The control device 9 supplies poly-phase AC power to the rotary electric machine 1 when the rotary electric machine 1 is used as an electric motor. In this embodiment, the poly-phase AC power is three-phase power.

The control device 9 is an electronic control unit. The control device 9 provides a control system. The control system has at least one arithmetic processing unit (CPU) and at least one memory device (MMR) as a storage medium for storing programs and data. The control system is provided by a microcomputer comprising a computer readable storage medium. The storage medium is a non-transitory tangible storage medium which non-transitory stores a computer readable program. The storage medium may be provided as a semiconductor memory, a magnetic disk, or the like. The control system may be provided by one computer or a group of computer resources linked via a data communication device. Means and/or functions provided by the control system can be provided by software recorded in a substantive memory device and a computer that can execute the software, software only, hardware only, or some combination of them. For example, the control system can be provided by a logic called if-then-else type, or a neural network tuned by machine learning. Alternatively, for example, if the control system is provided by an electronic circuit that is hardware, the control system may be provided by a digital circuit or an analog circuit that includes a large number of logic circuits.

The stator coil 7 has coil ends 11 and 12 and straight portions 13. The coil end 11 is also referred to as a first coil end. The coil end 12 is also referred to as a second coil end. The stator coil 7 has a lead wire 14 extending from the coil end 12. The stator coil 7 includes a plurality of lead wires 14. The leader line 14 is arranged on the coil end 12. The lead wires 14 provide both ends of a plurality of coils as a poly-phase winding. In this embodiment, since a three-phase winding is provided, at least six lead wires 14 are provided. Further, in this embodiment, one phase is provided by the parallel connection of "n" coils. Therefore, the stator coil 7 has 6×n pieces of the lead wires 14. In this embodiment, one phase is provided by a parallel connection of four coils. Therefore, the stator coil 7 includes 24 pieces of the lead wires 14. The stator coil 7 is electrically connected so as to form a poly-phase connection. The stator coil 7 is connected to provide star or delta connection. In this embodiment, the stator coil 7 provides a star connection.

The straight portion 13 extends straight along the axial direction. The straight portion 13 is accommodated in the slot. In this embodiment, eight straight portions 13 are accommodated in one slot.

The coil ends 11 and 12 are positioned at ends of the stator core 6. The coil ends 11 and 12 protrude from the stator core 6 in the axial direction. The coil ends 11 and 12 are bundles of a plurality of segment conductors included in the stator coil 7. At the coil ends 11 and 12, one segment conductor connects one straight portion 13 positioned in one slot to one straight portion 13 positioned in another different slot. The coil ends 11 and 12 may be provided by continuous turn portions of the segment conductor. The coil ends 11 and 12 may be provided by joint portions which joints different segment conductors.

The rotary electric machine 1 has one end SD1 and the other end SD2 on an opposite side of the one end SD1. The coil end 11 in a one end SD1 is formed by arranging only the turn portions 15 of the segment conductors. The coil end 12 at the other end SD2 includes a plurality of joint portions 16. The joint portion 16 is formed by jointing an end portion of one segment conductor and another end portion of another segment conductor. The plurality of joint portion 16 may be provided by various jointing methods. As a jointing method, for example, TIG welding, electric resistance welding, solder jointing, or the like can be used. The coil end 12 is formed by arranging only a plurality of joint portions 16. All of the plurality of joint portions 16 for forming the stator coil 7 are arranged at the coil end 12. Therefore, the stator coil 7 connects a plurality of straight portions 13 by a plurality of turn portions 15 at the coil end 11 on the one end SD1. Therefore, the stator coil 7 connects a plurality of straight portions 13 by the plurality of joint portions 16 at the coil end 12 on the other end SD2.

Figure 2:
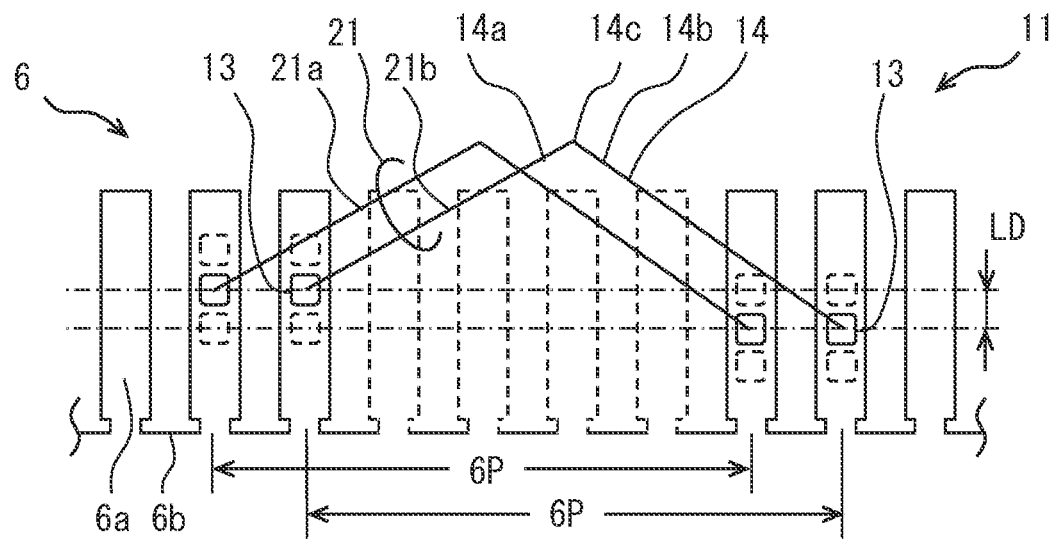
FIG. 2 is an explanatory diagram showing an example of a coil end.
Figure 3:
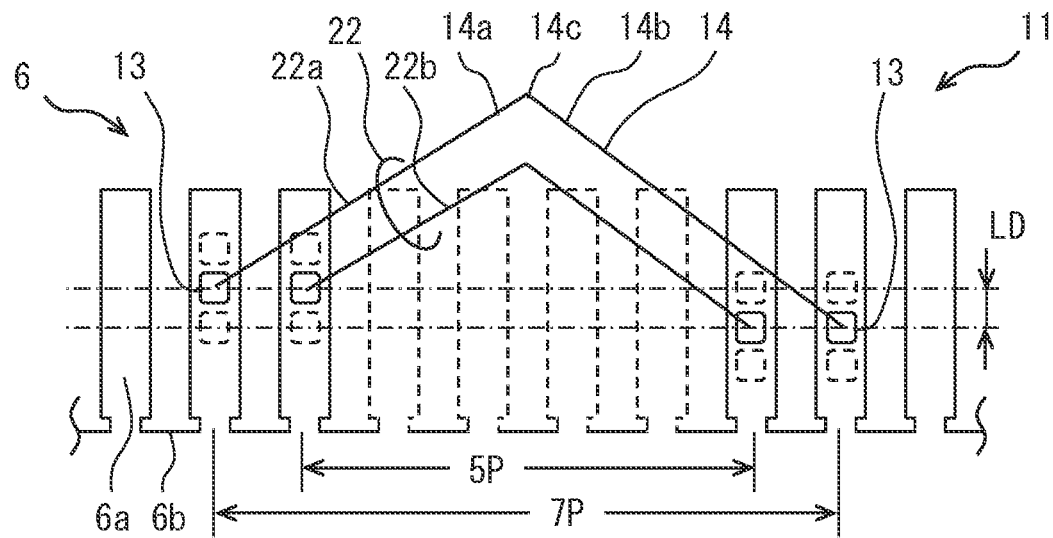
FIG. 3 is an explanatory diagram showing an example of a coil end.

FIGS. 2 and 3 are schematic explanatory views showing a relationship between the stator core 6 and the coil end 11. The stator core 6 includes a plurality of slots 6a and a plurality of teeth 6b. The turn portion 15 is a bend portion provided by bending a continuous conductor. The turn portion 15 continuously connects the straight portion 13 in one slot 6a and the straight portion 13 in the other slot 6a. The turn portion 15 extends from the stator core 6 in the axial direction AD, shifts to the circumferential direction CD, and also shifts to the radial direction RD. The turn portion 15 extends from the stator core 6 in the axial direction AD by a predetermined height. The turn portion 15 shifts along the stator core 6 in the circumferential direction CD by a predetermined pitch. The turn portion 15 shifts by the interlayer distance LD in the radial direction RD along the stator core 6. The plurality of turn portions 15 are arranged so as to avoid interference each other.

The turn portion 15 has an oblique portion 15a, an oblique portion 15b, and a top portion 15c. The oblique portions 15a and 15b extend obliquely from the stator core 6 with respect to the axial direction AD. Moreover, the oblique portions 15a and 15b shift in the circumferential direction CD. A shifting amount in the circumferential direction CD provided by the entire turn portion 15 is also called a pitch. The top portion 15c in the circumferential direction includes not only an apex but also parts before and after the apex. The top portion 15c shifts in the radial direction RD. A shifting amount of the top portion 15c is the interlayer distance LD.

Returning to FIG. 1, the segment conductors are schematically illustrated as lines. The plurality of turn portions 15 arranged at the coil end 11 form a circumferential pair 21 and an axial pair 22.

The coil end 11 has a plurality of circumferential pairs 21 arranged along the radial direction RD. In the illustrated example, the coil end 11 comprises four circumferential pairs 21 arranged along the radial direction RD. A plurality of circumferential pairs 21 arranged along the radial direction RD form one circumferential group 23. The coil end 11 includes a plurality of circumferential groups 23 arranged along the circumferential direction. These plurality of circumferential groups 23 occupy a major circumferential range in the coil end 11 by being continuously and repeatedly arranged.

The coil end 11 has a plurality of axial pairs 22 arranged along the radial direction RD. In the illustrated example, the coil end 11 comprises four axial pairs 22 arranged along the radial direction RD. A plurality of axial pairs 22 arranged along the radial direction RD form one axial group 24. The coil end 11 includes a plurality of axial groups 24. The plurality of axial groups 24 are arranged intermittently with respect to the circumferential direction CD. The number of axial groups 24 is less than the number of circumferential groups 23. The axial group 24 occupies a minor circumferential range at the coil end 11.

In FIG. 2, the circumferential pair 21 includes a plurality of turn portions 15 whose top portions 15c are displaced from each other in the circumferential direction CD. The circumferential pair 21 includes at least a first turn portion 21a and a second turn portion 21b. In this specification, the word "pair" is defined as a word which may include two or more. The circumferential pair 21 extends from the stator core 6 by a height HG21. The stator core 6 accommodates a plurality of straight portions 13 for one phase winding in a plurality of slots 6a and 6a adjacent in the circumferential direction CD. The circumferential pair 21 includes a plurality of turn portions 21a and 21b connecting two straight portions in two slots separated by "n" pitches, which is a natural number. In this embodiment, "n" is 6.

Two turn portions 21a and 21b forming the circumferential pair 21 are arranged between the two slots 6a separated by 6P (6 pitches). The turn portions 21a and 21b connect the straight portions 13 arranged in one layer and the straight portions 13 arranged in different layers. In many cases, an even number of straight portions 13 are arranged in one slot 6a. Therefore, one circumferential group 23 includes an even number of circumferential pairs 21.

In FIG. 3, the axial pair 22 includes a plurality of turn portions 15 whose top portions 15c are displaced from each other in the axial direction AD. The axial pair 22 includes at least a first turn portion 22a and a second turn portion 22b. The axial pair 22 extends from the stator core 6 by a height HG22. The height HG21 is lower than the height HG22 (HG21<HG22). The stator core 6 accommodates a plurality of straight portions 13 for one phase winding in a plurality of slots 6a and 6a adjacent in the circumferential direction CD. The axial pair 22 includes the first turn portion 22a connecting two straight portions in two slots separated "n+1" pitches. The axial pair 22 includes the second turn portion 22b connecting two straight portions in two slots separated "n−1" pitches. In this embodiment, "n" is 6.

The turn portion 22a is arranged between two slots 6a separated by 7P (7 pitches). The turn portion 22b is arranged between two slots 6a separated by 5P (5 pitches). The turn portions 22a and 22b connect the straight portions 13 arranged in one layer and the straight portions 13 arranged in different layer. In many cases, an even number of straight portions 13 are arranged in one slot 6a. Therefore, one axial group 24 includes an even number of axial pairs 22.

In FIGS. 2 and 3, in this embodiment, one phase winding includes a plurality of straight portions 13 arranged in two adjacent slots 6a. These two adjacent slots 6a differ in electrical angle by about 30 degrees. In addition, in this specification, a word of about 30 degrees includes a range of 30±10 degrees. Two turn portions 21a and 21b forming the circumferential pair 21 connect the straight portions 13 having the same electric angle to each other. Two turn portions 22a and 22b forming the axial pair 22 connect the straight portions 13 having different electric angles to each other.

Figure 4:
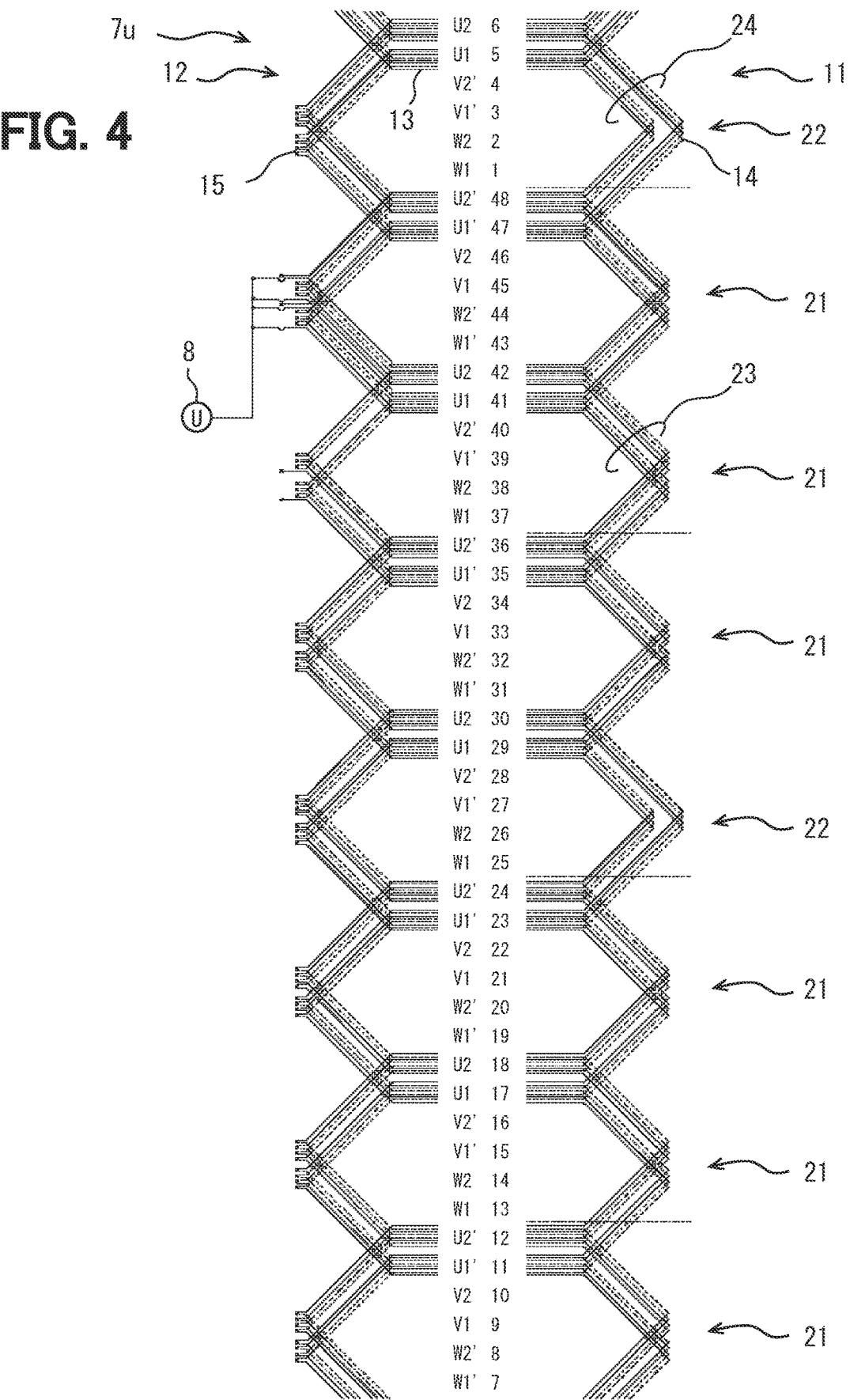
FIG. 4 is a winding diagram showing a coil end.

In FIG. 4, a U-phase winding 7u, which is one of the three-phase windings to provide the stator coil 7, is illustrated. The coil end 11 includes the circumferential group 23 including a plurality of circumferential pairs 21 arranged along the radial direction RD. The coil end 11 includes the axial group 24 including a plurality of axial pairs 22 arranged along the radial direction RD. Therefore, the coil end 11 is formed by the circumferential group 23 and the axial group 24 that are mounted in a mixed manner.

In the illustrated example, eight layers of straight portions 13 are arranged in one slot 6a. The U-phase winding 7u includes 16 straight portions 13 accommodated in two adjacent slots 6a. The U-phase winding 7u has the circumferential pair 21 and the axial pair 22 at the coil end 11. The U-phase winding 7u has six circumferential groups 23 and two axial groups 24. The remaining V-phase windings and W-phase windings are similar to the U-phase windings 7u. As a result, the stator coil 7 includes 18 (6×3) circumferential groups 23 and 6 (2×3) axial groups 24. The U-phase winding 7u has the joint portion 16 only at the coil end 12. The U-phase winding 7u has the leader wires 14 connected to the power terminals 8 only at the coil end 12.

Returning to FIG. 1, the housing 5 has a complicated shape at the one end SD1. The complicated shape appears on an opposing surface 17 of the inner surface of the housing 5 facing the coil end 11. The complicated shape appears as an uneven shape of the opposing surface 17. The uneven shape is caused by various factors. The uneven shape may be caused by, for example, a bolt mounted on the housing 5. The uneven shape may occur, for example, at a needs from the power system 10. The uneven shape is inevitable. Due to the uneven shape of the housing 5, the gap between the housing 5 and the coil end 11 may be reduced. The gap between the housing 5 and the coil end 11 is preferably narrower from the viewpoint of heat and the viewpoint of physique, but it is desirable to exceed the minimum gap from the viewpoint of electric insulation and the viewpoint of vibration. From these viewpoints, it is desirable that the coil end 11 has a shape which can be adapted to the uneven shape on the opposing surface 17 of the housing 5.

The opposing surface 17 includes a convex portion 17a facing the circumferential direction pair 21. The opposing surface 17 includes a concave portion 17b facing the axial pair 22. The convex portion 17a is raised from the concave portion 17b toward the coil end 11 with respect to the axial direction AD. The convex portion 17a and the concave portion 17b are distributed along the circumferential direction CD. It is possible to assume a common reference plane RF5 in the housing 5. The reference surface RF5 is not an outer surface, and the housing 5 can also have unevenness on the outer surface. Assuming that a thickness from a reference plane RF5 is a thickness of the housing 5, the housing 5 has a thickness TH1 at a portion facing the circumferential pair 21. The housing 5 has a thickness TH2 at a portion facing the axial pair 22. The thickness TH1 is larger than the thickness TH2 (TH1>TH2).

A gap CL1 is formed between the circumferential pair 21 and the convex portion 17a. A gap CL2 is formed between the axial pair 22 and the concave portion 17b. The gap CL1 and the gap CL2 are equal to or larger than a lower limit value CLmin required for performance.

The circumferential pair 21 and the axial pair 22 make it possible to form a height distribution along the circumferential direction at the annular coil end 11. Therefore, it is possible to provide the coil end 11 which adapts the uneven shape of the opposing surface 17. Further, the effect caused by a difference between the circumferential pair 21 and the axial pair 22 can be obtained. The circumferential pair 21 and the axial pair 22, for example, cause a difference in an amount of cooling by cooling medium at their top portions. The cooling effect is improved by providing both the circumferential pair 21 and the axial pair 22. Further, since the number of the axial group 24 is smaller than the number of the circumferential group 23, it is possible to provide a relatively wide range which can be adapted to the convex portion of the opposing surface 17.

Figure 5:
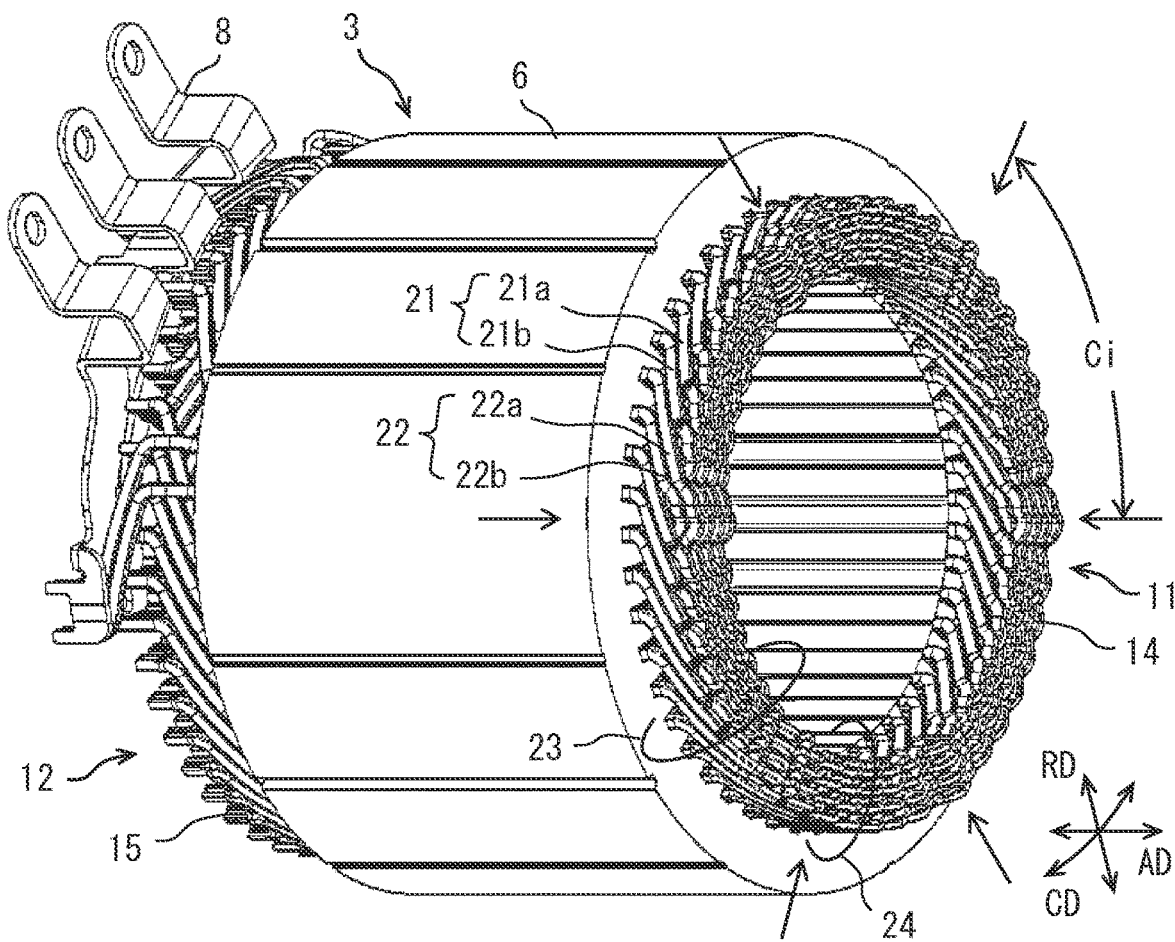
FIG. 5 is a perspective view of a stator.

In FIG. 5, in the illustrated example, six axial groups 24 are arranged at positions indicated by six straight arrow symbols. Six axial groups 24 are arranged at equal intervals Ci with respect to the circumferential direction CD. Therefore, the coil end 11 includes a plurality of axial groups 24 arranged at equal intervals Ci along the circumferential direction CD. In the illustrated example, 18 circumferential groups 23 are arranged. At the coil end 11, the circumferential group 23 provides a wider range than the axial group 24.

Two top portions 15c of the circumferential pair 21 are arranged so as to be offset from each other in the circumferential direction CD. Two top portions 15c of the axial pair 22 are arranged so as to be offset from each other in the axial direction AD. Therefore, when the cooling medium flows along the radial direction RD, the cooling medium is more likely to hit the plurality of top portions in the axial pair 22 than in the circumferential pair 21. In the case that the cooling medium flows along the axial direction AD, the cooling medium is more likely to hit the plurality of top portions in the circumferential pair 21 than in the axial pair 22.

According to the embodiment described above, the stator of the rotary electric machine and the rotary electric machine having a height distribution at the coil end 11 are provided. Further, it is possible to provide a height of the coil end 11 which can adapt the unevenness of the opposing surface 17 of the housing 5. Moreover, the coil end 11 which takes advantage of the circumferential pair 21 and the axial pair 22 is provided. Therefore, the rotary electric machine and the stator thereof which can be adapted to the shape of the housing are provided.

Second Embodiment

This embodiment is a modification based on the preceding embodiments. In the above embodiment, six axial groups 24 are arranged at equal intervals. Alternatively, in this embodiment, the axial groups 24 are arranged at unequal intervals.

Figure 6:
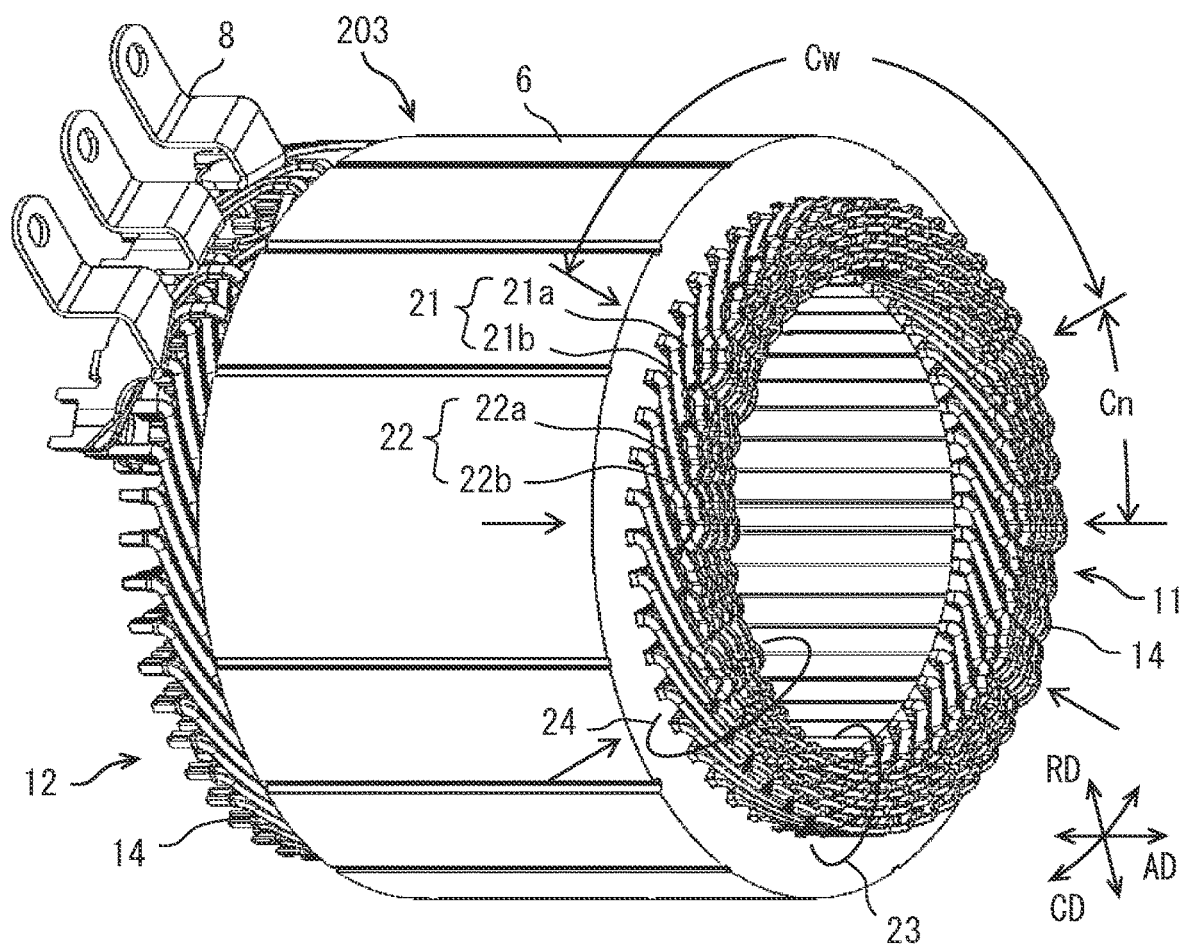
FIG. 6 is a perspective view of a stator according to a second embodiment.

In FIG. 6, six axial groups 24 are arranged on the diameter of the stator 203 in a concentrated manner in the circumferential CD. The plurality of axial groups 24 form a narrow interval Cn and a wide interval Cw. The wide interval Cw is wider than the narrow interval Cn (Cn<Cw). Therefore, the coil end 11 includes a plurality of axial groups 24 arranged at unequal intervals Cn and Cw along the circumferential direction CD. According to this embodiment, the housing 5 can be provided with two wide convex portions and two narrow concave portions along the circumferential direction CD.

Third Embodiment

This embodiment is a modification based on the preceding embodiments. In the above embodiment, the rotary electric machine 1 includes six axial groups 24. Alternatively, in this embodiment, a rotary electric machine 1 includes three axial groups 24.

In FIG. 7, a U-phase winding 307u, which is one of the three-phase windings to provide the stator coil 7, is illustrated. In the illustrated example, six layers of straight portions 13 are arranged in one slot 6a. The U-phase winding 307u has seven circumferential groups 23 and one axial group 24. The remaining V-phase winding and W-phase winding are similar to the U-phase windings 307u. As a result, the stator coil 7 includes 21 (7×3) circumferential groups 23 and 3 (1×3) axial groups 24.

Other Embodiments

The disclosure in this specification, the drawings, and the like is not limited to the illustrated embodiments. The disclosure encompasses the illustrated embodiments and variations thereof by those skilled in the art. For example, the present disclosure is not limited to the combinations of components and/or elements shown in the embodiments. The present disclosure may be implemented in various combinations. The present disclosure may have additional members which may be added to the embodiments. The present disclosure encompasses omission of the components and/or elements of the embodiments. The present disclosure encompasses the replacement or combination of components and/or elements between one embodiment and another. The disclosed technical scope is not limited to the description of the embodiment. Several technical scopes disclosed are indicated by descriptions in the claims and should be understood to include all modifications within the meaning and scope equivalent to the descriptions in the claims.

The disclosure in the specification, drawings and the like is not limited by the description of the claims. The disclosures in the specification, the drawings, and the like encompass the technical ideas described in the claims, and further extend to a wider variety of technical ideas than those in the claims. Therefore, various technical ideas can be extracted from the disclosure of the specification, the drawings and the like without being limited to the description of the claims.

What is claimed is:

1. A stator of a rotary electric machine, the stator comprising:
    a stator core which has a plurality of slots; and
    a stator coil which connects a plurality of straight portions arranged in the plurality of slots by a plurality of turn portions in a first coil end on one end, and connects a plurality of straight portions arranged in the plurality of slots by a plurality of joint portions in a second coil end on the other end, wherein
    the first coil end is arranged with the plurality of turn portions so as to form a circumferential pair whose top portions are shifted in a circumferential direction and an axial pair whose top portions are shifted in an axial direction, and wherein the second coil end is arranged with lead wires connected to power terminals.

2. The stator of a rotary electric machine according to claim 1, wherein the stator core accommodates a plurality of straight portions for one phase winding in the plurality of slots adjacent to each other in the circumferential direction, and wherein the circumferential pair includes a plurality of turn portions which connects two straight portions in two slots separated by "n" pitches, which is a natural number, and wherein the axial pair includes:

a first turn portion which connects two straight portions in two slots separated by "n+1" pitches; and a second turn portion which connects two straight portions in two slots separated by "n−1" pitches.

3. The stator of a rotary electric machine according to claim 2, wherein

"n" is six.

4. The stator of a rotary electric machine according to claim 1, wherein the first coil end includes:

a circumferential group including a plurality of the circumferential pairs arranged along a radial direction; and an axial group including a plurality of the axial pairs arranged along the radial direction.

5. The stator of a rotary electric machine according to claim 4, wherein the number of the axial group is smaller than the number of the circumferential group.

6. The stator of a rotary electric machine according to claim 4, wherein the first coil end includes a plurality of axial groups arranged at equal intervals along the circumferential direction.

7. The stator of a rotary electric machine according to claim 4, wherein the first coil end includes a plurality of axial groups arranged at unequal intervals along the circumferential direction.

8. A rotary electric machine, comprising:

the stator of the rotary electric machine according to claim 1; and a housing which accommodates the stator, and has an opposing surface including a convex portion facing the circumferential pair and a concave portion facing the axial pair.

9. The rotary electric machine according to claim 8, wherein there is a gap equal to or larger than a lower limit value between the circumferential pair and the convex portion, and wherein there is a gap equal to or larger than a lower limit value between the axial pair and the concave portion.

10. The rotary electric machine according to claim 8, wherein the convex portion and the concave portion are distributed along the circumferential direction.

* * * * *